United States Patent
Ono et al.

(10) Patent No.: US 9,091,548 B2
(45) Date of Patent: Jul. 28, 2015

(54) INFORMATION PROCESSING APPARATUS, INFORMATION PROCESSING METHOD, AND PROGRAM

(71) Applicant: SONY CORPORATION, Minato-ku (JP)

(72) Inventors: Hideyuki Ono, Kanagawa (JP); Masanori Katsu, Tokyo (JP); Yasutaka Fukumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 13/922,770

(22) Filed: Jun. 20, 2013

(65) Prior Publication Data

US 2014/0005931 A1    Jan. 2, 2014

(30) Foreign Application Priority Data

Jun. 27, 2012   (JP) ................. 2012-143956

(51) Int. Cl.
*G01C 21/00*   (2006.01)
*G06T 11/60*   (2006.01)
*G01C 21/20*   (2006.01)

(52) U.S. Cl.
CPC .............. *G01C 21/00* (2013.01); *G01C 21/206* (2013.01); *G06T 11/60* (2013.01)

(58) Field of Classification Search
CPC ................................ G01C 21/00; G06T 11/60
USPC .......................................... 701/445; 345/660
See application file for complete search history.

(56) References Cited

U.S. PATENT DOCUMENTS

| 4,608,656 A | * | 8/1986 | Tanaka et al. ................. 701/455 |
| 2013/0131973 A1 | * | 5/2013 | Friedler et al. ............... 701/409 |
| 2014/0107918 A1 | * | 4/2014 | Friedler et al. ............... 701/445 |

FOREIGN PATENT DOCUMENTS

JP        2008-104029         5/2008

* cited by examiner

*Primary Examiner* — Mary Cheung
*Assistant Examiner* — Brian P Sweeney
(74) *Attorney, Agent, or Firm* — Hazuki International, LLC

(57) ABSTRACT

There is provided an information processing apparatus including a display control unit for causing a display unit to display a map, a first operation obtaining unit for obtaining a first operation for moving a center of a designated area on the map, a second operation obtaining unit for obtaining a second operation different from the first operation for moving the center, and a size setting operation obtaining unit for obtaining a size setting operation for setting a size of the designated area.

13 Claims, 14 Drawing Sheets

INFORMATION PROCESSING APPARATUS, INFORMATION PROCESSING METHOD, AND PROGRAM

BACKGROUND

The present disclosure relates to an information processing apparatus, an information processing method, and a program.

Position estimation techniques using a global positioning system (GPS) are commonly known. Position information that is obtained by a position estimation technique is used, for example, to provide route guidance, surrounding spots information, or the like to a user. However, the initialization of position estimation using a GPS is a time consuming task due to the use of radio waves from a satellite. In addition, the position estimation using a GPS is difficult to function at the places such as indoors or underground.

Thus, for example, as described in Japanese Patent Application Laid-Open Publication No. 2008-104029, a technique that estimates the position of a terminal device by using the signal strength between the terminal device and a base station whose position is known is employed in wireless communications such as wireless fidelity (Wi-Fi) standards. Japanese Patent Application Laid-Open Publication No. 2008-104029 further discloses also a technique that registers a base station and its position and updates the registered information based on information regarding the signal transmitted by the user along with position information of the user. It is thus possible to improve the accuracy of position estimation even when the number of the base stations is increased and its position is changed.

SUMMARY

As described above, in the position estimation technique that uses a feedback from the user, the accuracy of information transmitted from the user is important. In other words, it is desirable to be able to obtain position information that more accurately represents a position of a user recognized by the user. However, techniques for obtaining such position information have not been sufficiently proposed yet.

Therefore, according to an embodiment of the present disclosure, there is provided a novel and improved information processing apparatus, information processing method, and program that capable of obtaining position information that more accurately represents a position of a user recognized by the user.

According to an embodiment of the present disclosure, there is provided an information processing apparatus including a display control unit for causing a display unit to display a map, a first operation obtaining unit for obtaining a first operation for moving a center of a designated area on the map, a second operation obtaining unit for obtaining a second operation different from the first operation for moving the center, and a size setting operation obtaining unit for obtaining a size setting operation for setting a size of the designated area.

Further, according to an embodiment of the present disclosure, there is provided an information processing method including causing a display unit to display a map, obtaining a first operation for moving a center of a designated area on the map, obtaining a second operation different from the first operation for moving the center, and obtaining a size setting operation for setting a size of the designated area.

Further, according to an embodiment of the present disclosure, there is provided a program for causing a computer to execute functions of causing a display unit to display a map, obtaining a first operation for moving a center of a designated area on the map, obtaining a second operation different from the first operation for moving the center, and obtaining a size setting operation for setting a size of the designated area.

Further, according to an embodiment of the present disclosure, there is provided an information processing apparatus including a communication unit for receiving, from a terminal device which is used by a user, information regarding a center of a designated area on a map and a size of the designated area, and a position information correction unit for correcting information used to estimate a position of the user by using the center of the designated area as the position of the user recognized by the user and by using the size of the designated area as an error range of the position of the user.

In order for the user to designate a certain area on a map, operations for moving the area and setting the size of the area are performed. This allows the position of the user recognized by the user to be represented, for example, by a combination of the position and the error range. It is thus possible for the user to obtain position information that represents more accurately the position of the user recognized by the user.

According to the embodiments of the present disclosure described above, it is possible to obtain position information that represents more accurately the position of the user recognized by the user.

DETAILED DESCRIPTION OF THE EMBODIMENT(S)

Figure 1:
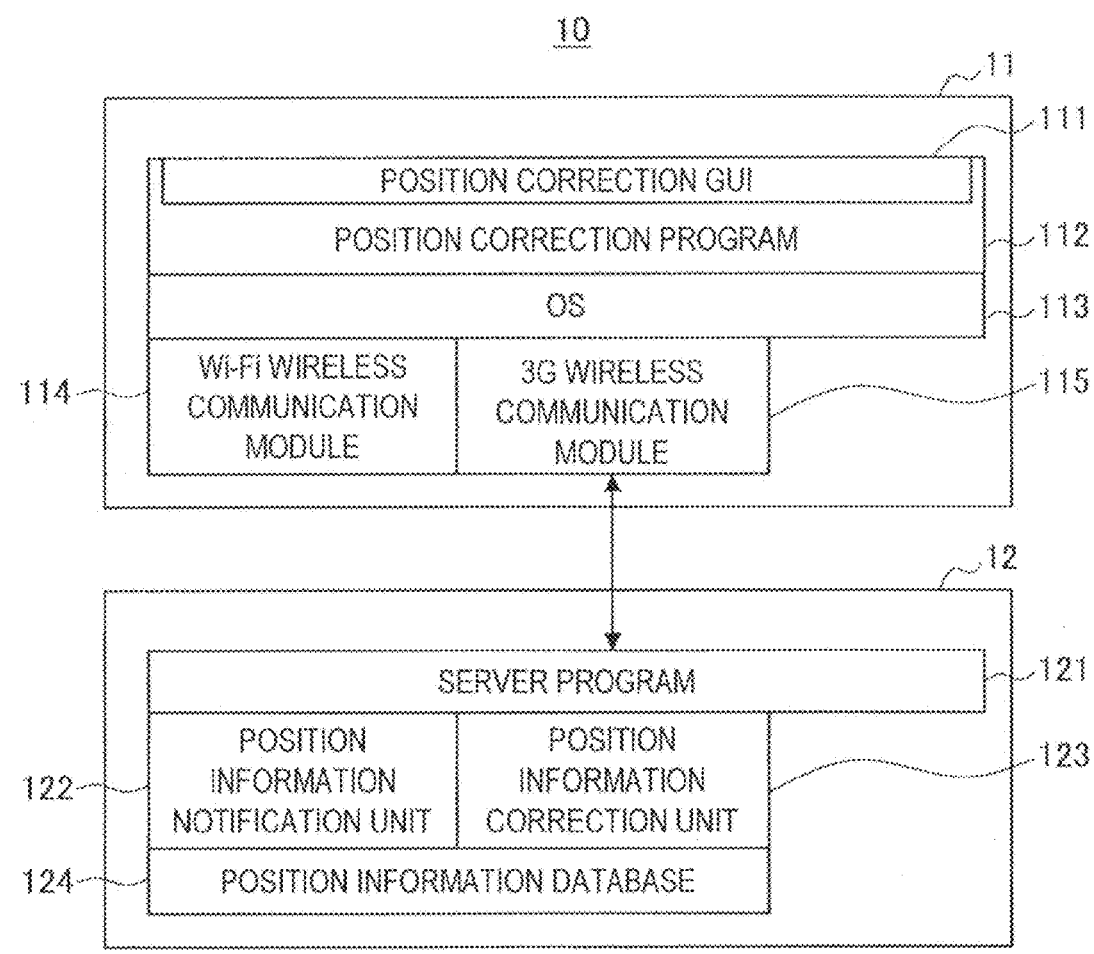
FIG. 1 is a diagram illustrating a schematic configuration of a position estimation system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. System configuration
2. Exemplary user interface
3. Exemplary processing sequence
4. Exemplary position information correction
5. Exemplary functional configuration
6. Another exemplary user interface
7. Hardware configuration
8. Additional notes (1. System Configuration)

FIG. 1 is a diagram illustrating a schematic configuration of a position estimation system according to an embodiment of the present disclosure. As shown in FIG. 1, the position estimation system 10 includes a terminal device 11 and a server 12. The terminal device 11 and the server 12 are connected to each other via the Internet.

(Terminal Device)

The terminal device 11 is a device that can be carried by the user, such as a personal computer (PC) or a mobile phone (e.g., a smart phone), and it may be implemented, for example, by a hardware configuration of an information processing apparatus to be described later. The terminal device 11 receives estimated position information based on the signal strength in Wi-Fi wireless communications from the server 12 and transmits correction information for the estimated position information to the server 12.

To perform such function, the terminal device 11 includes a position correction program 112 that is executed on an operating system (OS) 113. The position correction program 112 uses a Wi-Fi wireless communication module 114 through the OS 113, and it thus detects a neighboring base station (access point) and the signal strength from the base station. Information regarding the detected access point and its signal strength is transmitted from a 3G wireless communication module 115 to the server 12. In the illustrated example, the terminal device 11 is connected to the Internet via a 3G line, and thus the 3G wireless communication module 115 is used in the communication between the terminal device 11 and the server 12. For example, if the terminal device 11 is connected to the Internet via Wi-Fi wireless communications, then the Wi-Fi wireless communication module 114 is used in the communication between the terminal device 11 and the server 12.

The 3G wireless communication module 115 receives the estimated position information of the terminal device 11 from the server 12 and provides the estimated position information to the position correction program 112 through the OS 113. The position correction program 112 outputs the estimated position information to a user through a position correction graphical user interface (GUI) 111. In addition, the position correction program 112 obtains correction information for the estimated position information, which is inputted by the user. This correction information is obtained from the user through the position correction GUI 111. The position correction program 112 transmits the correction information to the server 12 through the 3G wireless communication module 115.

(Server)

The server 12 is a single device on a network or a plurality of devices that cooperates with each other on a network. The server 12 may be implemented, for example, by a hardware configuration of the information processing apparatus to be described later. The server 12 transmits the estimated position information obtained based on the signal strength in the Wi-Fi wireless communications to the terminal device 11 and receives correction information for the estimated position information from the terminal device 11.

To perform such function, the server 12 includes a server program 121. The server program 121 receives information regarding the detected access point and signal strength from the terminal device 11 by using an appropriate communication module. In the server program 121, a position information notification unit 122 estimates a position of the terminal device 11 based on the information regarding the detected access point and signal strength. The position estimation uses registration information of an access point associated with corresponding position information, which is stored in a position information database 124. Here, if an access point that is not registered in the position information database 124 is detected by the information, the position information notification unit 122 registers information regarding the access point in the position information database 124. The estimated position information for the terminal device 11 is transmitted from the server 12 to the terminal device 11 through the communication module.

As described above, in the terminal device 11, correction information for the estimated position information is obtained, and the obtained correction information is transmitted to the server 12. In the server program 121, a position information correction unit 123 updates the registration information of the access point stored in the position information database 124 based on the correction information. For example, the position information correction unit 123 updates position information of the access point registered in the position information database 124 based on the correction information. The updating of information in the position information database 124 can be performed, for example, by employing the technique described in Japanese Patent Application Laid-Open Publication No. 2008-104029.

(2. Exemplary User Interface)

Figure 2:
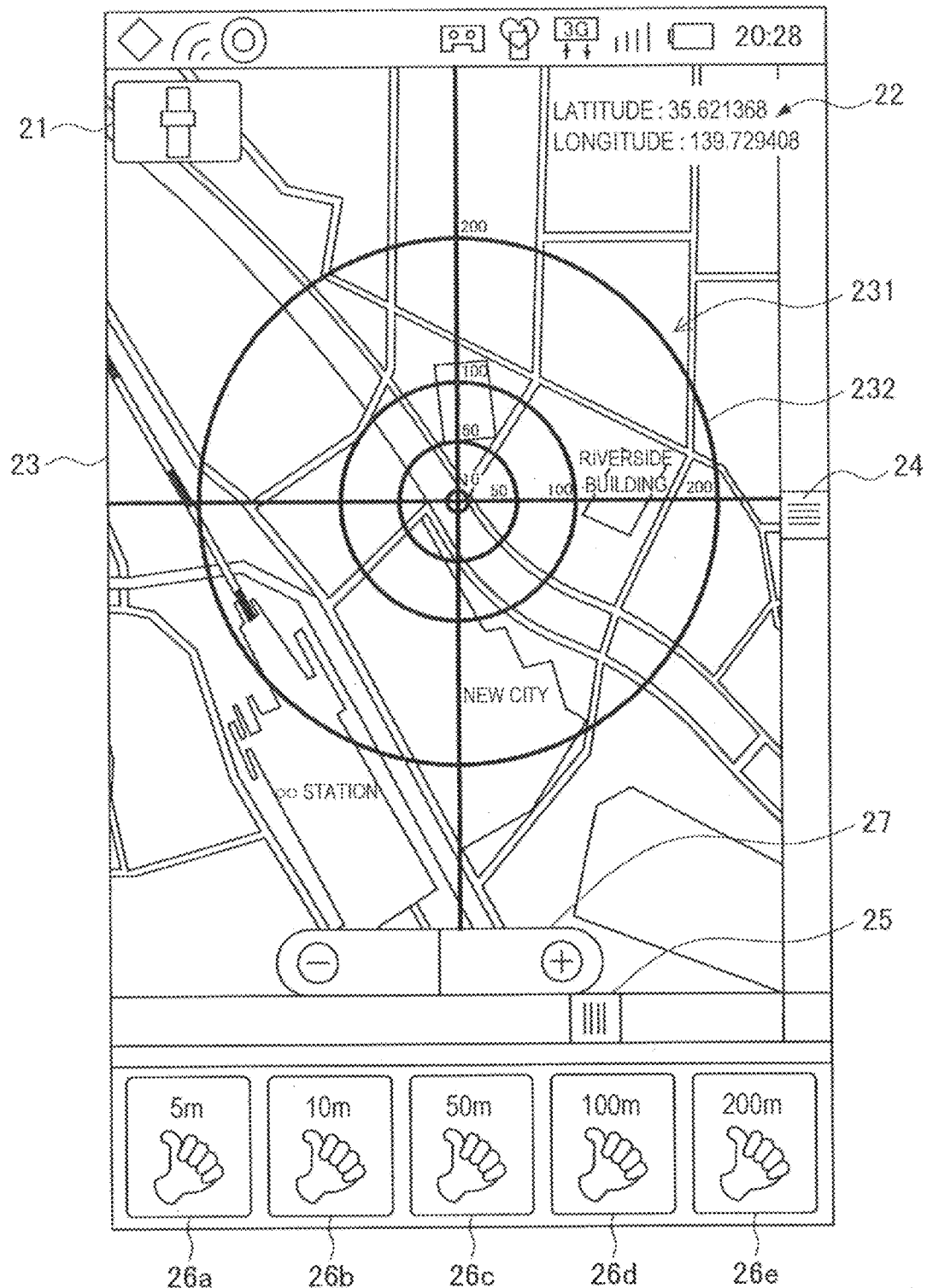
FIG. 2 is a diagram illustrating an example of a user interface according to an embodiment of the present disclosure.

FIG. 2 is a diagram illustrating an example of a user interface according to an embodiment of the present disclosure. An example of a screen displayed on the terminal device 11 as the position correction GUI 111 is shown in FIG. 2. The screen is displayed with various elements including an estimated position obtaining button 21, latitude and longitude information 22, a map display area 23, a vertical axis slider 24, a horizontal axis slider 25, a corrected position determination button 26, and a map zoom button 27.

The estimated position obtaining button 21 is a button for instructing the terminal device 11 to obtain estimated position information. When the estimated position obtaining button 21 is pressed through a touch panel or the like, the terminal device 11 obtains estimated position information from the server 12.

The latitude and longitude information indication 22 is information indicating the latitude and longitude of a position which is being displayed. These latitude and longitude values may be, for example, the latitude and longitude values respectively of the center of a target 232 to be described later. If estimated position information is obtained by pressing the estimated position obtaining button 21, then the latitude and longitude information 22 is set according to the estimated position information obtained from the server 12. After that, if a position corresponding to the center of the target 232 is shifted by the movement of a map 231 or the target 232, then the latitude and longitude information 22 is varied accordingly.

The map display area 23 is a display area including the map 231 and the target 232. The map 231 is a drawing in which a particular area on the earth is represented on a predetermined scale. The target 232 indicates a position (i.e., a position of the user) of the terminal device 11 on the map 231. In the illustrated example, the target 232 includes a cross wire of the vertical and horizontal directions and concentric circles centered on the intersection of the cross wire. The concentric circle is represented at each predetermined radial distance from the center. In the illustrated example, the concentric circle is represented at distance intervals of 10, 50, 100, and 200 meters from the center.

The display area on the map 231 can be freely moved and zoomed in/out by a drag operation through a touch panel or the like and an operation to be performed by the map zoom button 27. On the other hand, a display position of the target 232 can be freely moved by the operations of the vertical axis slider 24 and the horizontal axis slider 25. The user's position indicated by the target 232 can be adjusted by allowing the user to combine these two operations.

The vertical axis slider 24 and the horizontal axis slider 25 are icons which are intended to move the target 232 as described above. When the vertical axis slider 24 slides up and down, the target 232 is moved up and down accordingly. When the horizontal axis slider 25 slides from side to side, the target 232 is moved from side to side accordingly.

In the present embodiment, the amount of movement of the target caused by the operations of the vertical axis slider 24 and the horizontal axis slider 25 is set to be shorter than the amount of movement (the distance over which a scroll bar of the slider has moved on a display unit) of each of the sliders. For example, the amount of movement of the target 232 during the operation of each slider may be set to one-half of the amount of operation of each slider. In this case, for example, in a state where the target 232 is displayed in the center of the map display area 23, even when the vertical axis slider 24 slides up to the top of the map display area 23, the target 232 is moved only to a position halfway between the center and the top of the map display area 23.

On the other hand, in the present embodiment, the movement amount of the display area on the map 231 by the drag operation is set to be equivalent to the operation amount of the drag operation (the distance over which a finger or the like has moved on a display unit). Thus, for example, when the map 231 is moved by the drag operation on a touch panel, if the map is dragged from the center to the top of the map display area 23, then the display area of the map 231 is moved so that the portion which has been displayed in the center of the map display area 23 before the drag operation may be located at the top of the map display area 23 after the drag operation.

In this way, the display area of the map 231 and the target 232 can be moved with different degrees of accuracy from each other by the operations for their respective movements. Thus, the user can adjust his/her position that is indicated by the target 232 in two stages. The first stage is intended to allow the position to be roughly set by the movement of the display area on the map 231. The second stage is intended to allow the position to be minutely set by the movement of the target 232.

The user recognizes his/her position with various degrees of accuracy depending on the circumstances. For example, when the user is in the immediate vicinity of a landmark such as buildings or intersections at a place with which the user is familiar, the user recognizes his/her position with a very high degree of accuracy. In such a case, when the display area on the map 231 is moved by the normal drag operation (the amount of movement is equivalent to the amount of operation), it is difficult to exactly align the target 232 to user's position recognized by the user. Even when the user recognizes his/her position with a very high degree of accuracy, if it is not provided with adequate techniques for inputting user's position, then information of the position recognized by the user may not be used in the correction of position information, and thus it would be very wasteful.

Thus, in the present embodiment, it is possible, by the operations of the vertical axis slider 24 and the horizontal axis slider 25, to move the target 232 with a higher degree of accuracy than the drag operation on the map 231. This allows the user to easily align the position indicated by the target 232 to the user's position recognized by the user with a very high degree of accuracy. Therefore, position information with high accuracy recognized by the user can be used in the correction or the like of the position information.

The corrected position determination button 26 includes five buttons 26a to 26e. The buttons 26a to 26e correspond to error radii of 5, 10, 50, 100, and 200 meters, respectively. The user inputs correction information for the estimated position information by pressing any one of these buttons. The correction information includes the latitude and longitude of a position indicated by the target 232 and the error radius indicated by the pressed one of the buttons 26a to 26e. More specifically, in the illustrated example, if a button 26c corresponding to an error radius of 50 meters is pressed, then the correction information may include information of "Latitude: 35.621368° N, Longitude: 139.729408° E, Error radius: 50 meters."

In the correction information, the designation of the error radius and the position is substantially similar to the designation of a circular area in which the radius around the position is equivalent to the error radius. In other words, in the determination of a corrected position using the corrected position determination button 26, though the user designates a position on the map 231, but actually, the user designates an area on the map 231. Although it is not shown in the illustrated example, when an error radius is 0 meter, a designated area becomes a circle with 0 meter radius, i.e., a point.

Furthermore, as shown, the error radius of the corrected position determination button 26 may be designated so that at least a part thereof is corresponded to the radius of the concentric circle indicated by the target 232. In the illustrated example, the error radii of 10, 50, 100, and 200 meters correspond to each radius of the concentric circles.

As described above, the user recognizes his/her position with various degrees of accuracy depending on the circumstances. For example, when there is no landmark nearby in an unfamiliar place, the accuracy of user's position recognized by the user is not very high. The user is able to recognize such a situation. In other words, the user often recognizes the accuracy of position information recognized by the user. Thus, in the present embodiment, position information is obtained as the correction information along with information regarding the error radius indicating the accuracy of which the user recognizes by using the corrected position determination button 26. Accordingly, the correction information obtained when the user recognizes his/her position with a very high degree of accuracy as described in the above example and the correction information obtained when the user recognizes his/her position with a lower degree of accuracy can be distinguished. This allows the position information to be more appropriately corrected. In addition, a specific example where position information is corrected using information of an error radius which is inputted by using the corrected position determination button 26 will be described later.

The map zoom button 27 is an icon that is adapted to zoom in/out the display area on the map 231 as described above. In the illustrated example, the map zoom button 27 is represented as a plus (+) button and a minus (−) button. When the plus button is pressed, the scale of the map 231 is increased and thus a narrower display area is displayed in detail. When the minus button is pressed, the scale of the map 231 is reduced and thus a wider display area is displayed roughly.

(3. Exemplary Processing Sequence)

Figure 3:
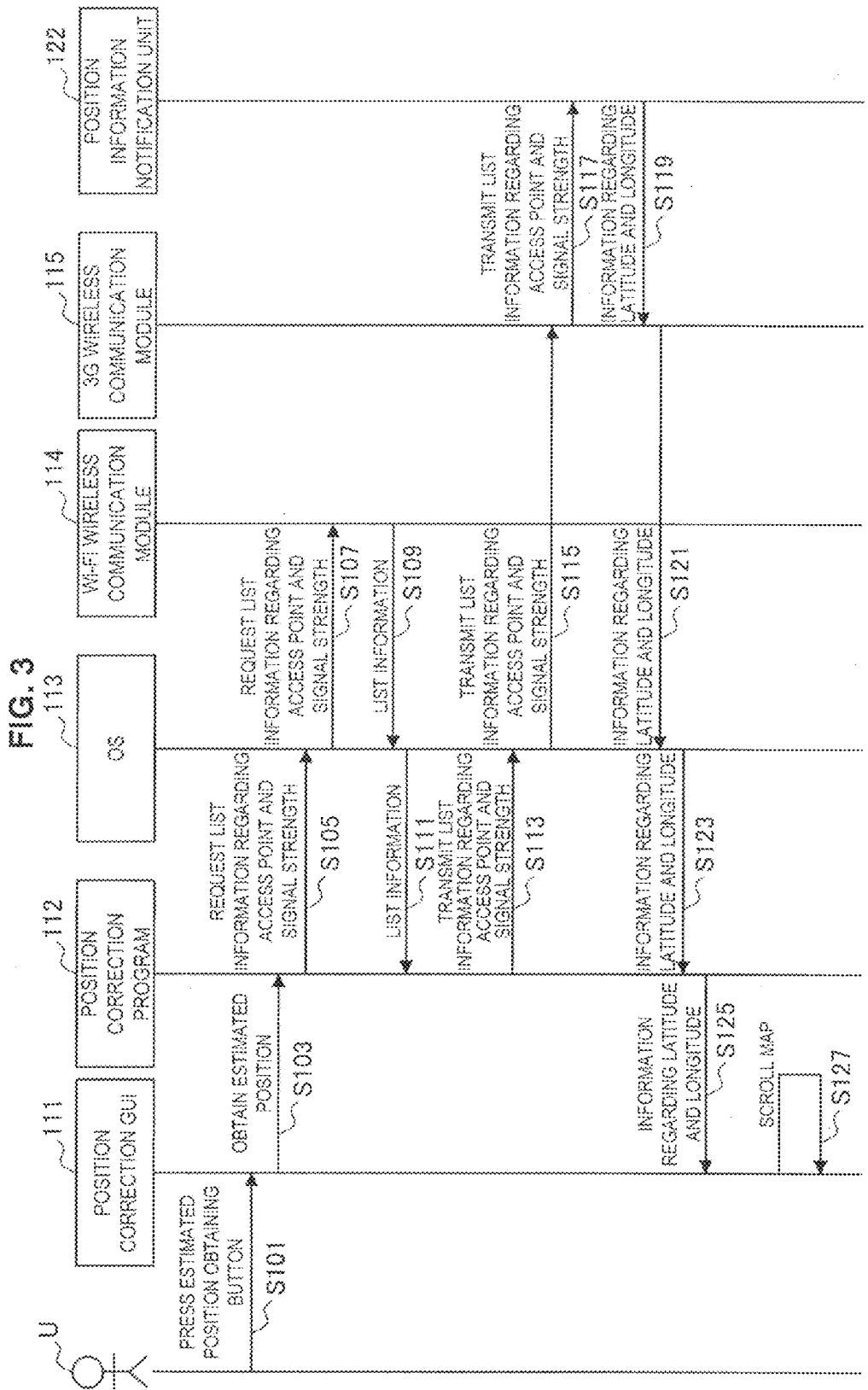
FIG. 3 is a diagram illustrating an example of a processing sequence according to an embodiment of the present disclosure.
Figure 4:
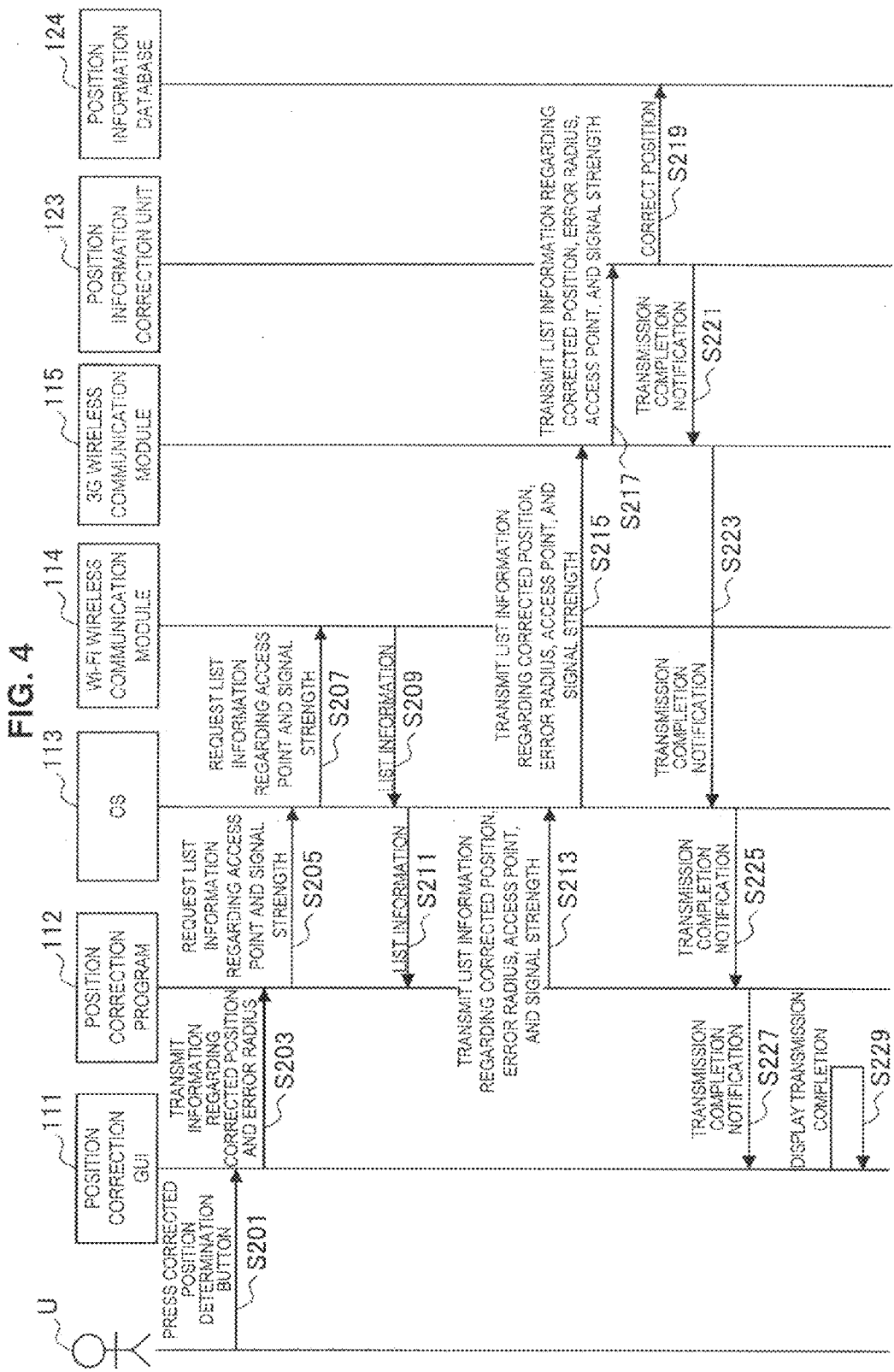
FIG. 4 is a diagram illustrating an example of a processing sequence according to an embodiment of the present disclosure.

FIG. 3 and FIG. 4 are diagrams illustrating an example of a processing sequence according to an embodiment of the present disclosure.

(Estimated Position Obtaining Process)

An example of a sequence of an estimated position obtaining process will now be described with reference to FIG. 3. As described above, the estimated position obtaining process is initiated from pressing the estimated position obtaining button 21 by a user U in the terminal device 11 (step S101). The pressing operation of the button is performed by the position correction GUI 111, and it is treated as an input for requesting for the position correction program 112 to obtain an estimated position (step S103).

When the position correction program 112 receives the input for the request, the position correction program 112 gains access to the Wi-Fi wireless communication module 114 through the OS 113 and requests list information regarding an access point and its signal strength (steps S105 and S107). The Wi-Fi wireless communication module 114 generates the list information described above based on the signal received from a neighboring access point and provides the generated list information to the position correction program 112 through the OS 113 (steps S109 and S111).

The position correction program 112, when obtaining the list information, transmits the obtained list information to the position information notification unit 122 of the server 12 through the OS 113 and the 3G wireless communication module 115 (steps S113, S115 and S117). The position information notification unit 122 generates information regarding the latitude and longitude as the estimated position information by referring to the position information database 124 based on the received information. The position information notification unit 122 transmits the information regarding the latitude and longitude toward the terminal device 11 (step S119).

In the terminal device 11, the 3G wireless communication module 115 receives the information regarding the latitude and longitude, and provides the information to the position correction program 112 through the OS 113 (steps S121 and S123). The position correction program 112 reflects the information regarding the latitude and longitude in the position correction GUI 111 (step S125). Specifically, the position correction GUI 111 scrolls the map 231 so that a position corresponding to the obtained latitude and longitude matches the center (which is also the center of the target 232 at this time) of the map 231 (step S127).

(Position Correction Process)

Next, referring to FIG. 4, an example of a sequence of a position correction process will be described. The position correction process may be performed, for example, subsequent to the estimated position obtaining process described above.

The estimated position information is presented to the user U by the position correction GUI 111. The user U corrects the position indicated by the estimated position information into the position recognized by the user using the user interface as described above with reference to FIG. 2, and then the user U presses the corrected position determination button 26 (step S201). This operation is treated as an input for requesting for the position correction program 112 to transmit information regarding the corrected position and error radius (step S203).

The position correction program 112, when receiving the input, performs again the process for obtaining list information regarding the access point and its signal strength from the Wi-Fi wireless communication module 114 (steps S205 to S211). When this process is performed, the position correction process may not necessarily be performed subsequent to the estimated position obtaining process. Alternatively, when the position correction process is performed subsequent to the estimated position obtaining process, if the time elapsed from the execution of the estimated position obtaining process is within a predetermined range, then the processes of steps S205 to S211 are omitted and the information obtained during the estimated position obtaining process may be used without any modification.

Next, the position correction program 112 transmits information regarding a corrected position and error radius and list information regarding an access point and its signal strength to the position information correction unit 123 of the server 12 through the OS 113 and the 3G wireless communication module 115 (steps S213, S215, and S217). The position information correction unit 123 corrects position information of an access point stored in the position information database 124 based on the received information (step S219). The position information correction unit 123 transmits a transmission completion notification indicating that the correction has been completed toward the terminal device 11 (step S221).

In the terminal device 11, the 3G wireless communication module 115 receives the transmission completion notification, and provides it to the position correction program 112 through the OS 113 (steps S223 and S225). The position correction program 112 outputs the transmission completion notification to the user U through the position correction GUI 111 (steps S227 and S229).

(Exemplary Position Information Correction)

Figure 5:
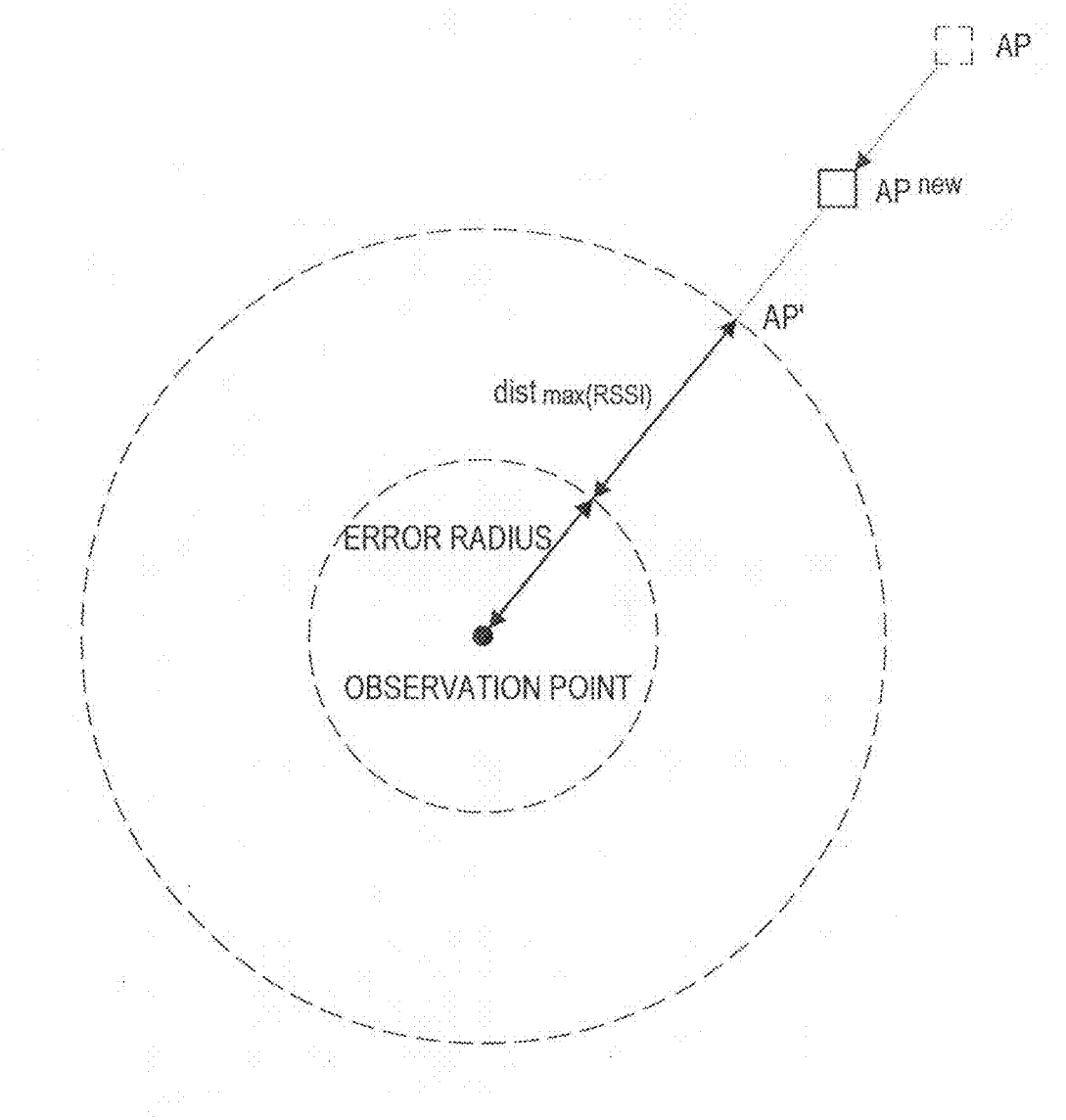
FIG. 5 is a diagram for explaining an example of position information correction according to an embodiment of the present disclosure.

FIG. 5 is a diagram for explaining an example of the correction of position information according to an embodiment of the present disclosure.

For example, in the technique for correcting position information as described in Japanese Patent Application Laid-Open Publication No. 2008-104029, an upper limit distance $dist_{max}(RSSI)$ from an observation point (the corrected position in the above example) of an access point AP is set based on a received signal strength indication (RSSI) from the access point AP. This is a constraint condition that "if it is based on the RSSI, then an access point AP is supposed to be present at a position within the $dist_{max}(RSSI)$ from the observation point."

Here, for example, when the position of the access point AP which is indicated by position information registered in the position information database 124 is a position at which a distance from the observation point is in excess of $dist_{max}(RSSI)$, the correction of position information is performed. More specifically, a position $AP^{new}$ of an updated access point according to the following Equation 1 is set between a position of original access point AP and a position AP' at which a distance from the observation point becomes $dist_{max}(RSSI)$. In Equation 1, pos( ) denotes each position. In Equation 1, t denotes a predetermined coefficient that is used to control the plasticity of the database (if t is close to 1, then the plasticity is low and the original registration information is regarded as important; if t is close to 0, then the plasticity is high and new registration information is regarded as important).

$$\text{pos}(AP^{new}) = t \times \text{pos}(AP) + (1-t) \times \text{pos}(AP') \quad (1)$$

In the present embodiment, the error radius obtained in the position correction process is added to the upper limit distance $\text{dist}_{max}(\text{RSSI})$. Thus, the above constraint condition is represented as "if it is based on the RSSI and error radius, then an access point AP is supposed to be present at a position within ($\text{dist}_{max}(\text{RSSI})$+error radius) from the observation point." In this case, as shown, the position AP' is close to the position of the original access point AP by the error radius. Thus, the position AP' of an updated access point is more close to the position of the original access point AP than a case where the error radius is not considered (where it is regarded as not be considered).

This means that an increase in the error radius changes the position $AP^{new}$ of the updated access point as the case where the coefficient t that is used to control the plasticity of the database is close to 1. Thus, the position information correction process in the present embodiment may be a process for adjusting dynamically the plasticity of the database according to the error radius of the corrected position. An example of the position information correction process is not limited the above examples. For example, the change in the value of the coefficient t according to the error radius may allow the plasticity of the database to be adjusted directly.

(5. Exemplary Functional Configuration)

Figure 6:
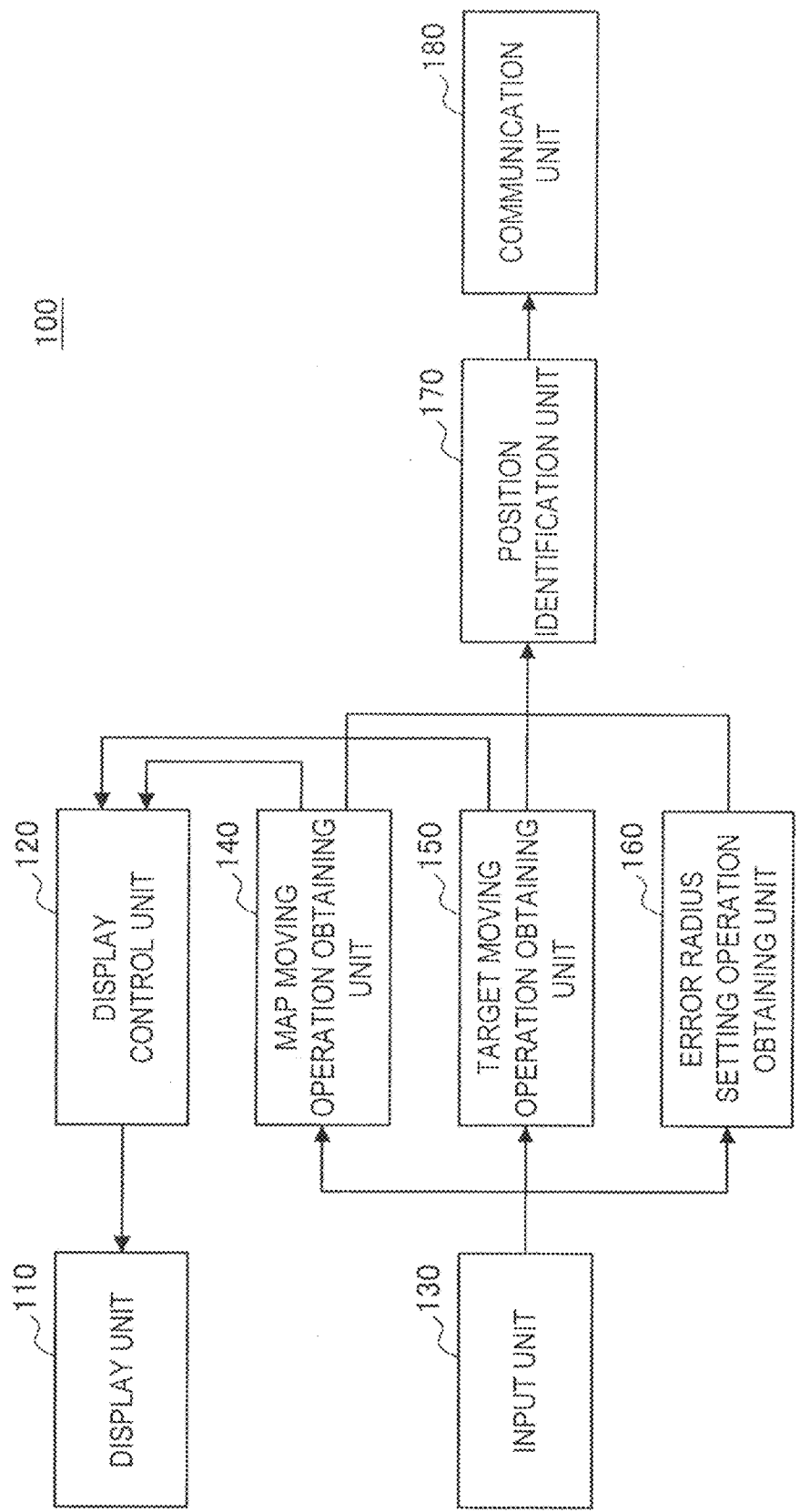
FIG. 6 is a block diagram illustrating a schematic functional configuration of a terminal device according to an embodiment of the present disclosure.

FIG. 6 is a block diagram illustrating a schematic functional configuration of a terminal device according to an embodiment of the present disclosure. A terminal device 100 of FIG. 6 is shown only a functional configuration related to the position correction process of the functional configurations of the terminal device 11 described in the above example.

The terminal device 100 includes a display unit 110, a display control unit 120, an input unit 130, a map moving operation obtaining unit 140, a target moving operation obtaining unit 150, an error radius setting operation obtaining unit 160, a position identification unit 170, and a communication unit 180 as functional structures. These functional structures may be implemented, for example, in a hardware configuration of the information processing apparatus to be described later. The display control unit 120, the map moving operation obtaining unit 140, the target moving operation obtaining unit 150, the error radius setting operation obtaining unit 160, and the position identification unit 170 may be implemented, for example, in software using a CPU (Central Processing Unit) as a part of the position correction program 112 described above.

The display unit 110 may be implemented by various types of display devices which are provided as an output device. The display unit 110 displays a screen such as the screen described as the position correction GUI 11 in the above example under the control of the display control unit 120.

The display control unit 120 causes the display unit 110 to display a map. The designation of an area is performed on the map. In the above example, the designated area is an area which are determined by a position of the user (the center of the area) indicated by the target 232 on the map 231 and the error radius (the radius of the area) designated by the corrected position determination button 26. The display control unit 120 may further cause the display unit 110 to display a target indication (the cross wire of the target 232 in the above example) including an indication representing the center of the designated area. The target indication may include a distance indication (the concentric circle of the target 232 in the above example) representing the distance from the center of the designated area.

The input unit 130 may be implemented by a touch panel or the like which is provided as an input device. The input unit 130 obtains an operation such as the operation described as the user operation to the position correction GUI 111 in the above example. More specifically, the input unit 130 obtains various operations such as the drag operation on the map 231, the operation for moving the target 232 using the vertical axis slider 24 and the horizontal axis slider 25, and the operation for inputting an error radius using the corrected position determination button 26 as described in the above example.

The map moving operation obtaining unit 140 obtains an operation for moving a map from among the operations obtained by the input unit 130. In the above example, the drag operation for moving the map 231 is an operation in which a display area on the map 231 is moved and consequently a user's position (the center of the designated area) indicated by the target 232 is moved. In other words, the drag operation can be regarded as the first operation for moving the center of the designated area.

The target moving operation obtaining unit 150 obtains an operation for moving the target from among the operations obtained by the input unit 130. In the above example, the operation for moving the target 232 using the vertical axis slider 24 and the horizontal axis slider 25 is the operation for moving the user's position (the center of the designated area) indicated by the target 232. In other words, the operation for moving the target 232 can be regarded as the second operation for moving the center of the designated area.

In the above example, the movement amount of the display area on the map 231 by the drag operation is set to be equivalent to the operation amount of the drag operation. On the other hand, the movement amount of the target 232 by the vertical axis slider 24 and the horizontal axis slider 25 is set to be smaller (e.g., one-half) than the operation amount of each slider. In this example, the operation using the sliders (the second operation) can be regarded as the operation for performing a fine adjustment of the position of the designated area which is set by the drag operation (the first operation). In addition, in the above example, the map moving operation obtaining unit 140 may convert the operation amount of the drag operation (the first operation) into the movement amount of the designated area at a first rate (one). The target moving operation obtaining unit 150 may convert the operation amount of the operation using the sliders (the second operation) into the movement amount of the designated area at a second rate (one-half) smaller than the first rate.

The error radius setting operation obtaining unit 160 obtains an operation for setting an error radius from among the operations obtained by the input unit 130. As described previously, the error radius may also be the radius of the designated area. Thus, the error radius setting operation obtaining unit 160 may also be a size setting operation unit which obtains a size setting operation for setting the size of the designated area. The error radius may be set by selecting from the options presented as the buttons 26a to 26e as the above example. At least a part of these options may correspond to the distance indication (concentric circle of the target 232 in the above example) representing the distance from the center of the designated area, which is included in the target indication.

Information obtained by the map moving operation obtaining unit 140, the target moving operation obtaining unit 150, and the error radius setting operation obtaining unit 160 is provided to the position identification unit 170. Information obtained by the map moving operation obtaining unit 140 and the target moving operation obtaining unit 150 is also provided to the display control unit 120, and it can be used to update a map or a target indication displayed on the display unit 110.

The position identification unit 170 identifies a user's position and an error range of the user's position based on information provided from each unit described above. As described previously, the user's position corresponds to the center of the designated area, and the error range corresponds to the size of the designated area. The position identification unit 170 transmits information regarding them to the server 12 through the communication unit 180. The communication unit 180 may be implemented by a communication device or the like.

(6. Another Example of User Interface)

In another embodiment of the present disclosure, in addition to the user interface as illustrated with reference to FIG. 2, various user interfaces can be available. In the following, an example of some of them will be described.

FIRST EXAMPLE

Figure 7:
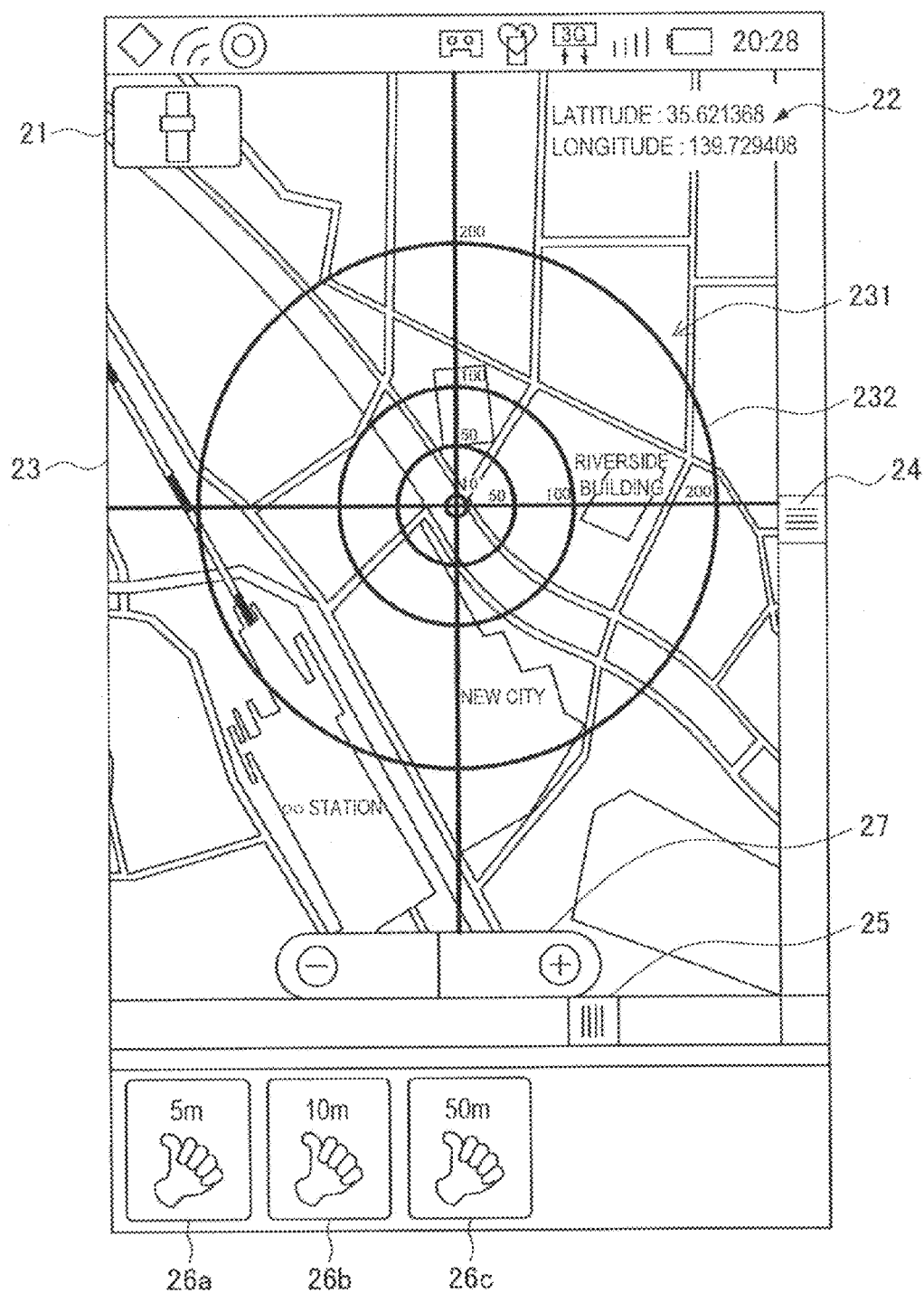
FIG. 7 is a diagram illustrating a first example of a user interface according to another embodiment of the present disclosure.

FIG. 7 is a diagram illustrating a first example of a user interface according to another embodiment of the present disclosure. In the illustrate example, three buttons 26a to 26c are shown as the corrected position determination button 26. The buttons 26a to 26c correspond to the error radii of 5, 10, and 50 meters, respectively. In this way, the number of the user corrected position determination buttons 26 may be arbitrarily determined. All of the corrected position determination buttons 26 may not necessarily correspond to concentric circles indicated as the target 232.

SECOND EXAMPLE

Figure 8:
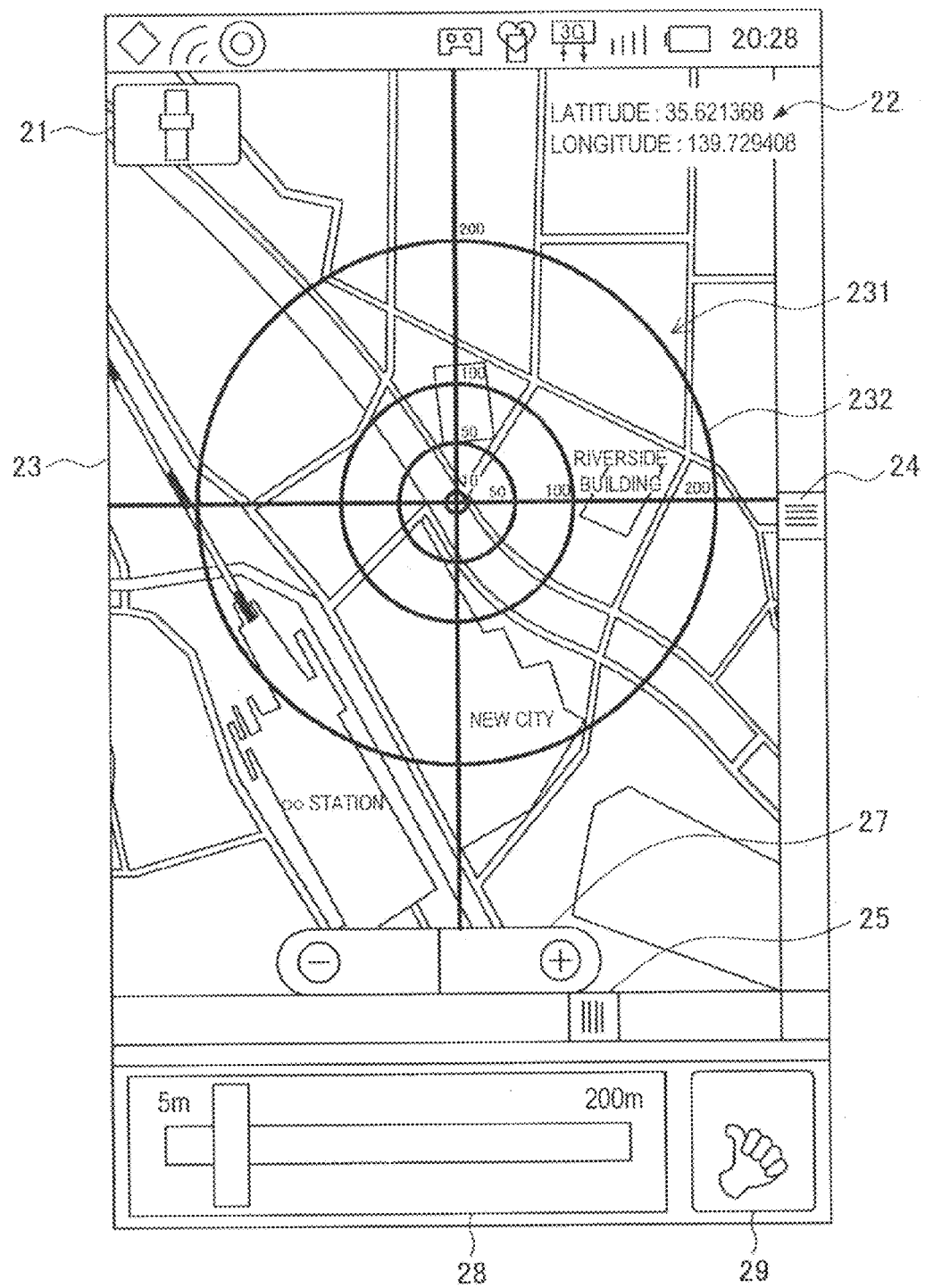
FIG. 8 is a diagram illustrating a second example of the user interface according to another embodiment of the present disclosure.

FIG. 8 is a diagram illustrating a second example of the user interface according to another embodiment of the present disclosure. In the illustrated example, an error radius slider 28 and a corrected position determination button 29 are shown as icons for inputting an error radius. The user sets an error radius using the error radius slider 28 and then presses the corrected position determination button 29. In this way, any arbitrary value can be inputted as an error radius, while the input operation for determining the corrected position will be performed two times (the input operation may be performed one time when using the corrected position determination buttons 26 in the above example).

In the example shown in FIG. 8, four concentric circles of 10, 50, 100, and 200 meters are indicated as the target 232 in a similar manner to the above example. In another example, only one concentric circle may be indicated. In this case, the radius of the concentric circle may be changed dynamically according to a value of the error radius which is set by the error radius slider 28.

THIRD EXAMPLE

Figure 9:
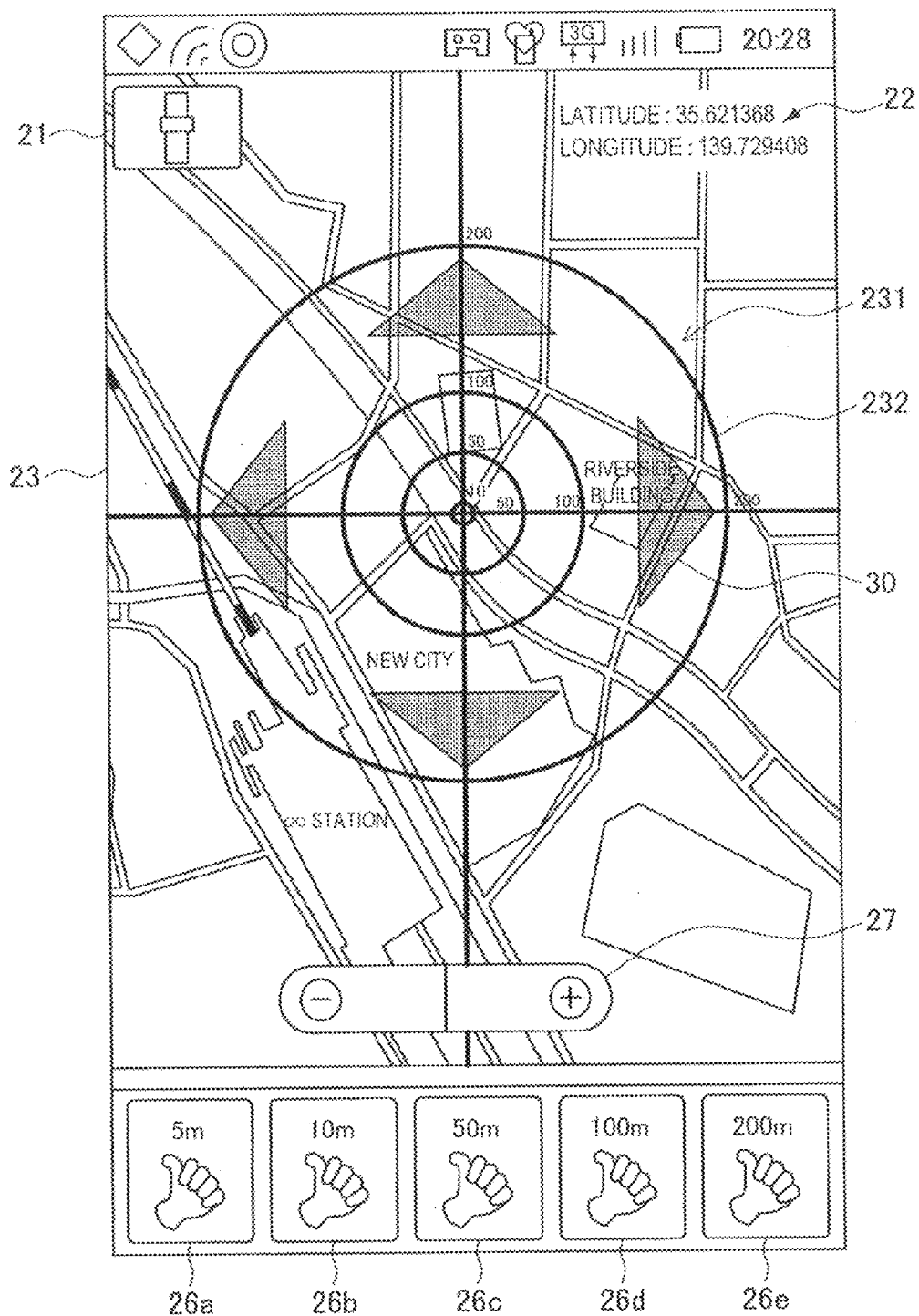
FIG. 9 is a diagram illustrating a third example of the user interface according to another embodiment of the present disclosure.

FIG. 9 is a diagram illustrating a third example of the user interface according to another embodiment of the present disclosure. In the illustrated example, a directional button 30 is shown as an icon which is used to move the target 232. The directional button 30 is indicated at each of the four directions, for example, left, right, top, and bottom directions. If the directional button 30 of each direction is pressed, then the target 232 is moved to the corresponding direction by a predetermined distance. The predetermined distance may be set to a distance corresponding to a minimum resolution value of the display on the map 231. Alternatively, the predetermined distance may be set to a distance corresponding to a minimum value (5 meters in the illustrated example) of the error radius that can be set. The directional button 30 may be indicated at a position (the position between a concentric circle of 100 meters and a concentric circle of 200 meters in the illustrated example) corresponding to the center of the target 232. In this case, the indicated position of the directional button 30 may be moved according to the movement of the target 232.

FOURTH EXAMPLE

Figure 10:
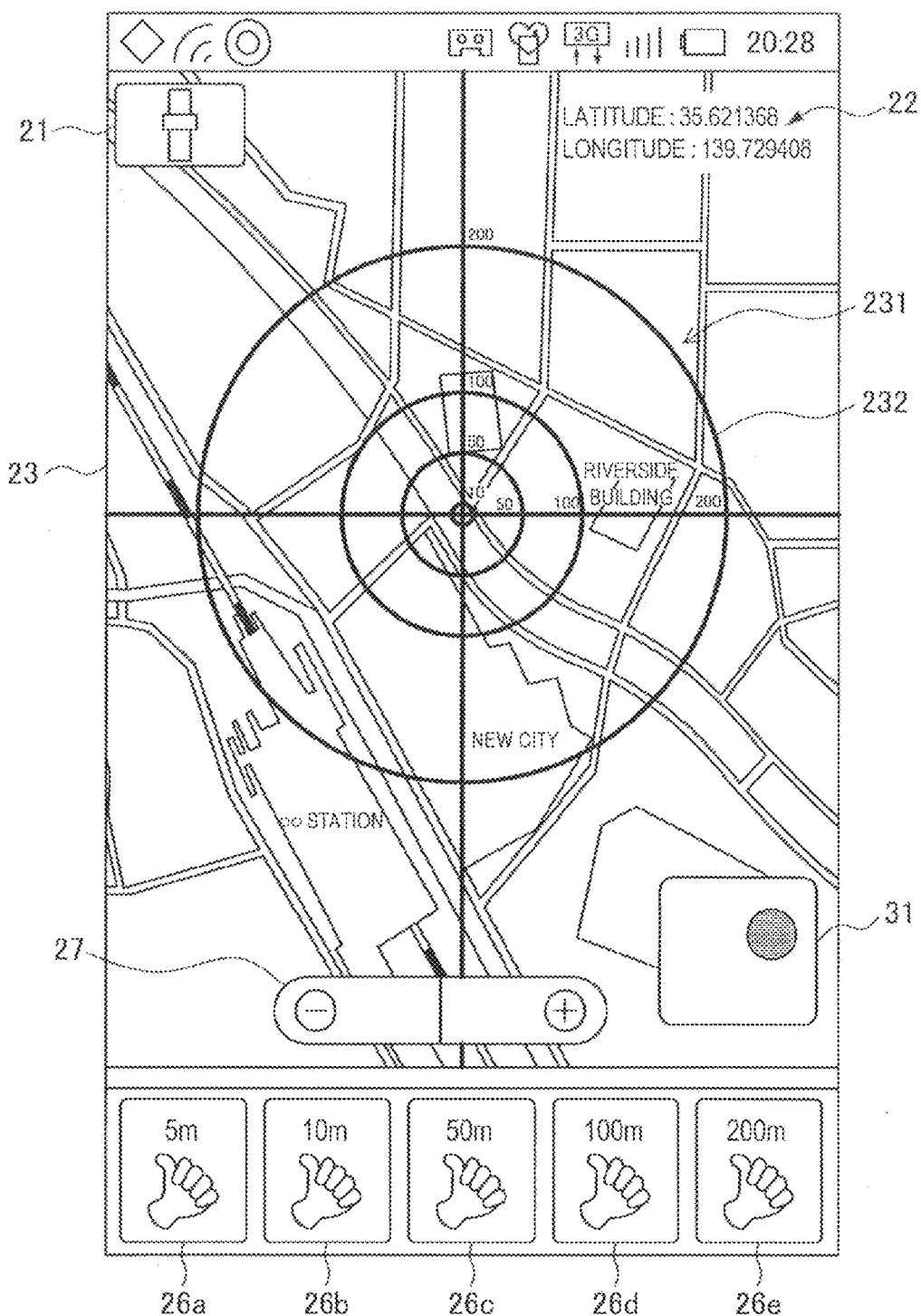
FIG. 10 is a diagram illustrating a fourth example of the user interface according to another embodiment of the present disclosure.

FIG. 10 is a diagram illustrating a fourth example of the user interface according to another embodiment of the present disclosure. In the illustrated example, a pointing stick shaped icon 31 is shown as an icon which is used to move the target 232. This icon 31 may be displayed at an end portion of the map display area 23. When a circular area displayed in the frame is dragged to any one direction, the target 232 is moved to the direction at a predetermined speed. The predetermined speed may be set to a relatively slow speed considering that the movement operation of the target 232 using the icon 31 performs a more fine adjustment as compared with the drag operation of the map 231.

FIFTH EXAMPLE

Figure 11:
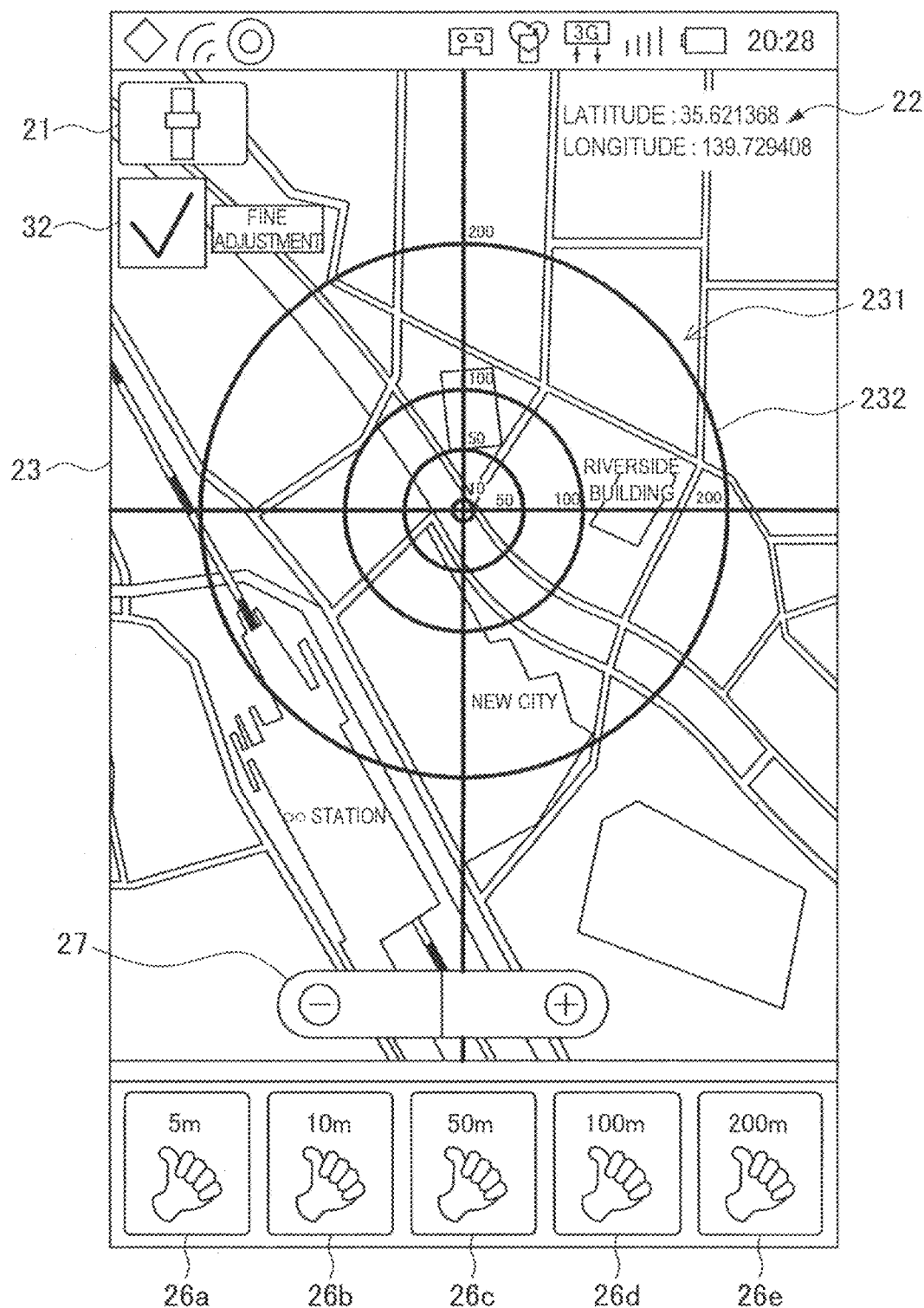
FIG. 11 is a diagram illustrating a fifth example of the user interface according to another embodiment of the present disclosure.

FIG. 11 is a diagram illustrating a fifth example of the user interface according to another embodiment of the present disclosure. In the illustrated example, the target 232 is moved by the drag operation through a touch panel or the like in a similar manner to the display area of the map 231. A check box icon 32 is displayed in order to select any one of a first mode in which the display area of the map 231 is moved by the drag operation and a second mode in which the target 232 is moved by the drag operation. If the check box icon 32 is in a non-selected state, then the display area of the map 231 is moved by the drag operation. If the check box icon 32 is in a selected state, then the target 232 is moved by the drag operation.

In this regard, for example, considering that the movement of the target 232 may be finely adjusted as compared with the movement of the display area on the map 231, the second rate at which the operation amount of the drag operation in the second mode is converted into the movement amount of the target 232 may be smaller than the first rate at which the operation amount of the drag operation in the first mode is converted into the movement amount of the display area on the map 231. In other words, the movement of the target 232 by the drag operation in the second mode may be slower than the movement of the display area on the map 231 by the drag operation in the first mode.

SIXTH EXAMPLE

Figure 12:
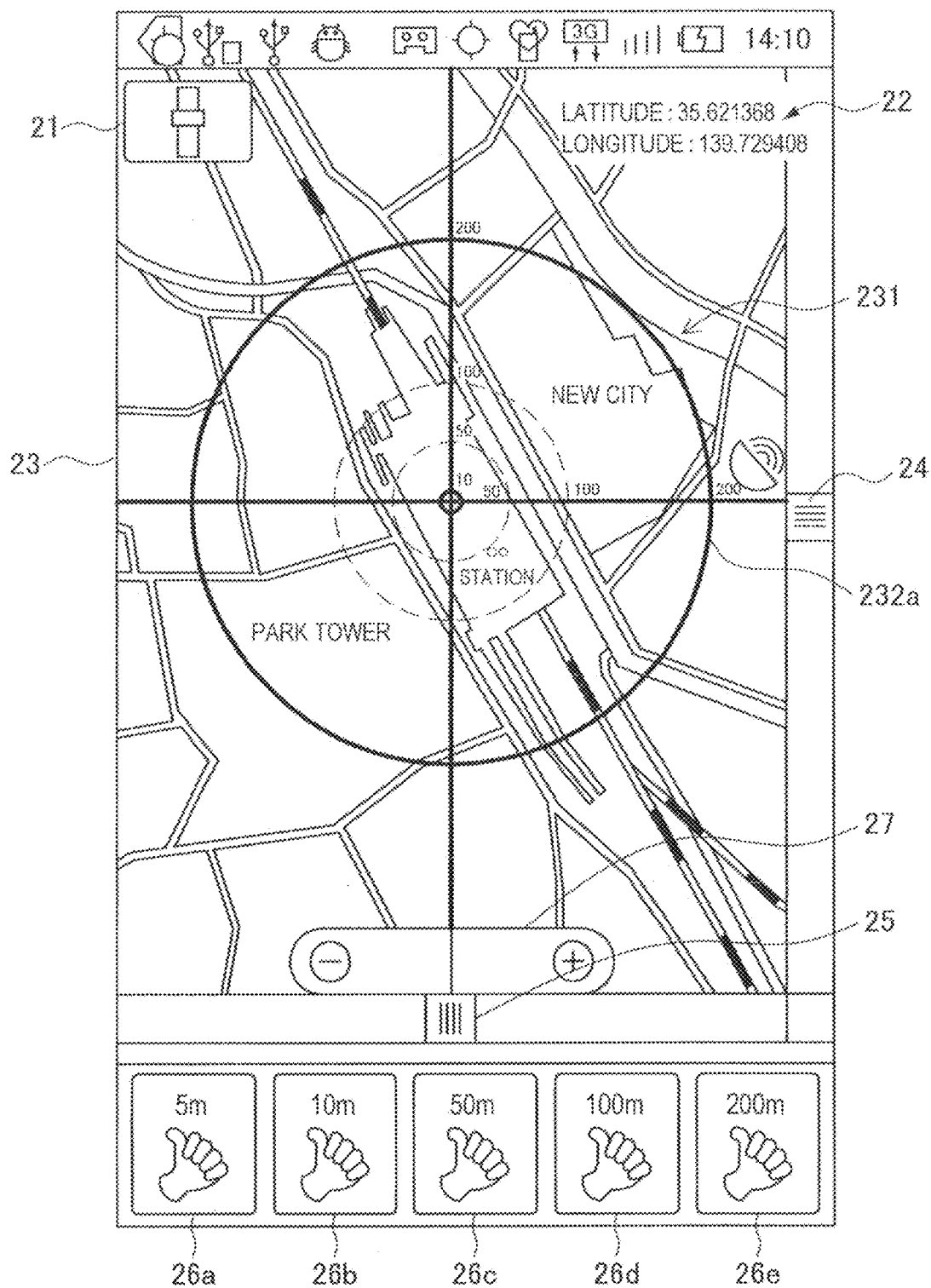
FIG. 12 is a diagram illustrating a sixth example of the user interface according to another embodiment of the present disclosure.

FIG. 12 is a diagram illustrating a sixth example of the user interface according to another embodiment of the present disclosure. In the illustrated example, a target 232a is shown with a highlighted concentric circle having an error radius corresponding to the magnitude of a landmark included in the map 231. The landmark is "∘∘ station", and it is included in the area having error radius of 200 meters with the user's current position as the center. Therefore, the display control unit 120 highlights the concentric circle of 200 meters as the target 232.

For example, when the estimated position of the user is included in the landmark, it is assumed that position correction information from the user indicates that the user is located within the landmark. Thus, it is more likely to be easy for the user to input the position correction information by highlighting the concentric circle of error radius corresponding to the magnitude of the landmark in advance. In this case, a button 26e of the corrected position determination buttons 26 which corresponds to the error radius may be highlighted. Of course, if the user recognizes a more specific position in the landmark, then a button corresponding to another error radius of the corrected position determination buttons 26 may be selected.

In another example, the position information correction unit 123 in the server 12 may use information regarding the landmark included in the map to correct the position. For example, in the above example shown in FIG. 12, when the error radius of 200 meters is selected, the position information correction unit 123 may be construed as indicating that information regarding the error radius and the corrected position provided from the user is "the user is at ○○ station." In this case, the error range area in the position correction may be limited to the area of "○○ station" (landmark) on the map rather than the circular area defined by the error radius.

SEVENTH EXAMPLE

Figure 13:
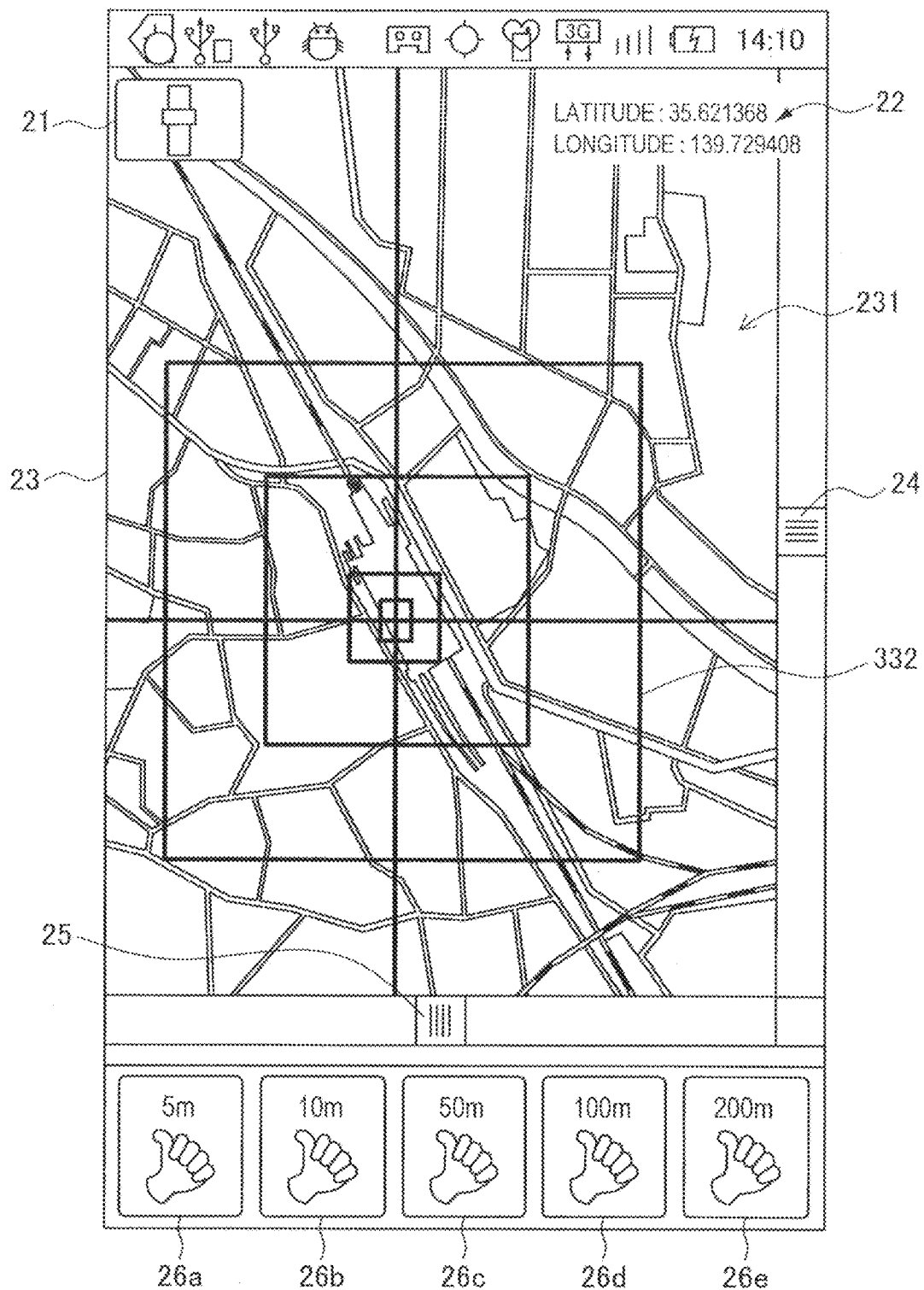
FIG. 13 is a diagram illustrating a seventh example of the user interface according to another embodiment of the present disclosure.

FIG. 13 is a diagram illustrating a seventh example of the user interface according to another embodiment of the present disclosure. In the illustrated example, a target 332 that includes a cross wire indicating the center and concentric rectangles indicating the distance from the center is shown. In this way, the distance indication included in the target 332 is not limited to the concentric circle. The distance indication may be a concentric rectangle such as the illustrated example, a scale on cross wire, or the like. For example, if a concentric rectangle is used as the distance indication, then it is easy to designate the error range with a shape close to the shape of a building which often is recognized as a landmark.

(7. Hardware Configuration)

Figure 14:
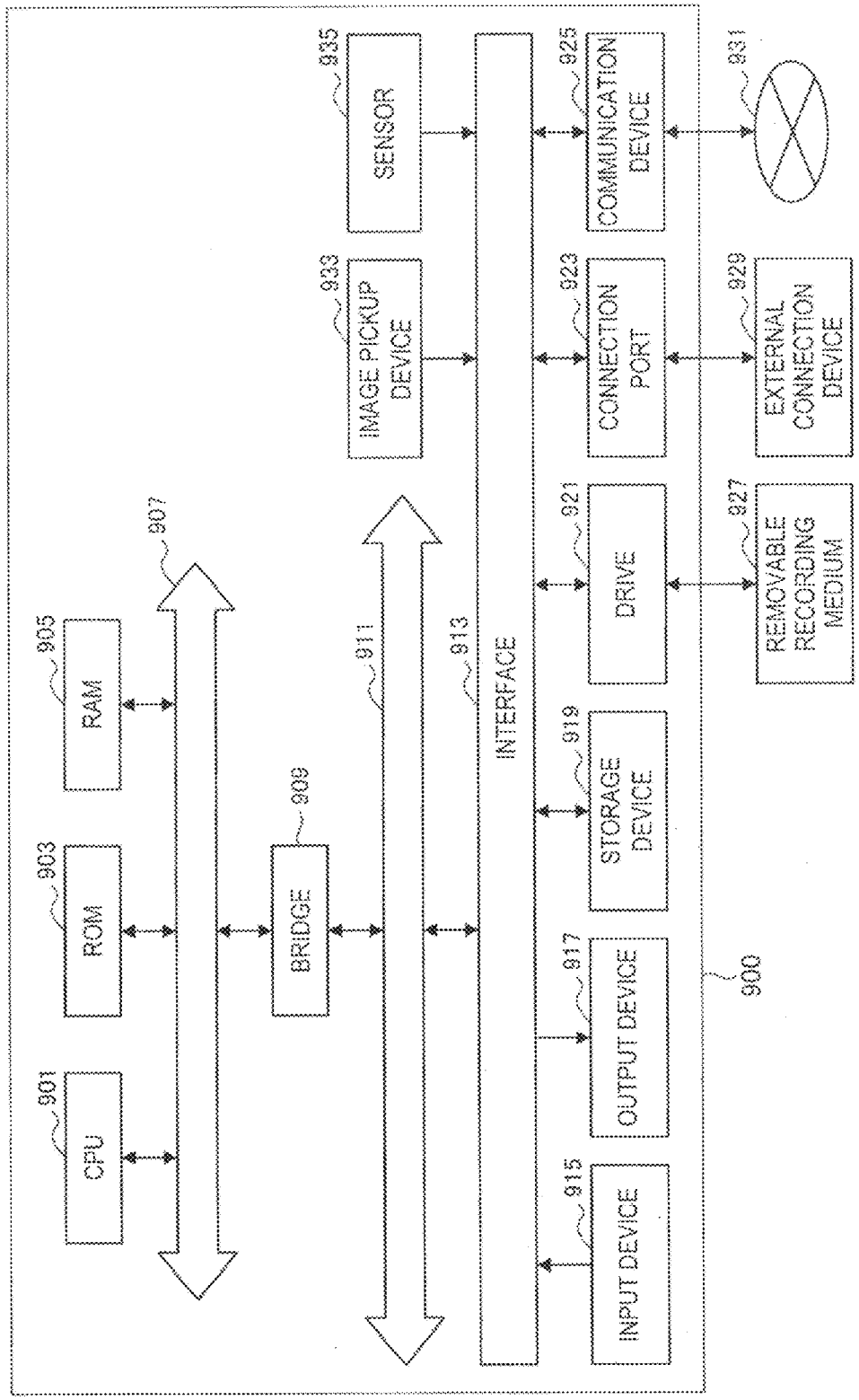
FIG. 14 is a block diagram for explaining a hardware configuration of an information processing apparatus.

A hardware configuration of the information processing apparatus according to the embodiment of the present disclosure will now be described with reference to FIG. 14. FIG. 14 is a block diagram for explaining a hardware configuration of the information processing apparatus. An information processing apparatus 900 shown in FIG. 14 may be implemented as the terminal device 11 (or the terminal device 100) and/or the server 12 in the embodiment described above.

The information processing apparatus 900 includes a CPU (Central Processing Unit) 901, a ROM (Read Only Memory) 903, and a RAM (Random Access Memory) 905. The information processing apparatus 900 may also include a host bus 907, a bridge 909, an external bus 911, an interface 913, an input device 915, an output device 917, a storage device 919, a drive 921, a connection port 923, and a communication device 925. The information processing apparatus 900 may further include an image pickup device 933 and a sensor 935 as necessary. The information processing apparatus 900 may include a processing circuit such as a DSP (Digital Signal Processor), alternatively or in addition to the CPU 901.

The CPU 901 functions as an arithmetic processing unit and a control unit, and controls all or some of the operations to be performed in the information processing apparatus 900 in accordance with various programs recorded in the ROM 903, the RAM 905, the storage device 919, or a removable recording medium 927. The ROM 903 stores programs, operation parameters, or the like which are used by the CPU 901. The RAM 905 primarily stores programs that are used in the execution of the CPU 901 and parameters which are appropriately modified in the execution. The CPU 901, the ROM 903, and the RAM 905 are connected to each other by the host bus 907 which includes an internal bus such as a CPU bus. The host bus 907 is connected to the external bus 911 such as a PCI (Peripheral Component Interconnect/Interface) bus via the bridge 909.

The input device 915 may be a device that is operated by a user, such as a mouse, a keyboard, a touch panel, buttons, a switch and a lever. The input device 915 may be, for example, a remote controller using infrared light or other radio waves, or it may be an external connection device 929 such as a mobile phone operable in response to the operation of the information processing apparatus 900. The input device 915 includes an input control circuit. The input control circuit generates an input signal based on information that is input by a user and outputs the input signal to the CPU 901. The operation of the input device 915 allows a user to input various types of data to the information processing apparatus 900 or to issue instructions for causing the information processing apparatus 900 to perform a processing operation.

The output device 917 includes a device capable of notifying a user of acquired information visually or audibly. The output device 917 may include a display device such as LCD (Liquid Crystal Display), PDP (Plasma Display Panel), and organic EL (Electro-Luminescence) displays, an audio output device such as speaker and headphone, and a printer. The output device 917 may output the results obtained from the process of the information processing apparatus 900 in a form of a video such as text or image, and an audio such as voice or sound.

The storage device 919 is a data storing device which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the information to the RAM 905. The drive 921 also writes data in the removable recording medium 927 attached thereto.

The connection port 923 is a port used to directly connect devices with the information processing apparatus 900. The connection port 923 may include a USB (Universal Serial Bus) port, an IEEE1394 port, and a SCSI (Small Computer System Interface) port. The connection port 923 may further include an RS-232C port, an optical audio connector, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication interface card for a wired or wireless LAN (Local Area Network), Bluetooth (registered trademark), WUSB (Wireless USB), or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet, or other communication devices based on a predetermined protocol such as TCP/IP. In addition, the communication network 931 connected to the communication device 925 may be a network connected in a wired or wireless manner, and may be, for example, the Internet, a home LAN, infrared communication, radio wave communication, satellite communication, or the like.

The image pickup device 933 includes image pickup elements such as CCD (Charge Coupled Device) or CMOS (Complementary Metal Oxide Semiconductor) and various components such as lens for controlling the image forming of a subject image to the image pickup elements. The image pickup device 933 captures a real space and generates a captured image using the image pickup elements and various components. The image pickup device 933 may be configured to capture a still image or a moving image.

The sensor 935 may be various kinds of sensors such as an acceleration sensor, a gyro sensor, a geomagnetic sensor, an optical sensor, a sound sensor. The sensor 935 acquires information regarding the state of the image processing apparatus 900 such as attitude of a housing of the image processing apparatus 900 or information regarding the surrounding environment of the image processing apparatus 900 such as brightness or noise around the image processing apparatus 900. The sensor 935 may include a GPS (Global Positioning System) sensor for receiving a GPS signal and measuring the latitude, longitude, and altitude of the device.

As above, the exemplary hardware configuration of the information processing apparatus 900 has been described. Each of the above-described constituent elements may be configured using general-purpose members, or may be configured by hardware specialized to the function of each constituent element. Therefore, a hardware configuration to be used may be appropriately modified according to the technical level at the time of implementing the embodiment.

(8. Additional Notes)

While the examples where the user's position information obtained by the terminal device is used for position correction in the position estimation system have been described with reference to preferred embodiments thereof, the embodiments of the present disclosure are not limited to the above examples. The obtained position information is not limited to the position correction but can be used for various purposes. For example, position information provided from the user can be used directly as information indicating the position of the user, or it can be provided to other users who are looking for the user.

The embodiments of the present disclosure may include the information processing apparatus (terminal device or server) as described above, the information processing system (position estimation system), the information processing method performed in the information processing apparatus or information processing system, the program for causing the information processing apparatus to function, and a recording medium with the program recorded thereon.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
 a display control unit for causing a display unit to display a map;
 a first operation obtaining unit for obtaining a first operation for moving a center of a designated area on the map;
 a second operation obtaining unit for obtaining a second operation different from the first operation for moving the center; and
 a size setting operation obtaining unit for obtaining a size setting operation for setting a size of the designated area.
(2) The information processing apparatus according to (1),
 wherein the second operation is an operation that finely adjusts a position of the designated area set by the first operation.
(3) The information processing apparatus according to (2),
 wherein the first operation obtaining unit converts an operation amount of the first operation into a movement amount of the designated area at a first rate, and
 wherein the second operation obtaining unit converts an operation amount of the second operation into the movement amount of the designated area at a second rate smaller than the first rate.
(4) The information processing apparatus according to any one of (1) to (4),
 wherein the display control unit causes the display unit to display a target indication which includes an indication representing the center of the designated area, and
 wherein the size setting operation is an operation which designates a radius from the center.
(5) The information processing apparatus according to (4),
 wherein the first operation is an operation which moves the center of the designated area by moving a display area on the map, and
 wherein the second operation is an operation which moves the center of the designated area by moving the target indication.
(6) The information processing apparatus according to (5),
 wherein the display control unit causes the display unit to display an icon for the movement operation,
 wherein the first operation is a drag operation to be performed on the map, and
 wherein the second operation is an operation to be performed for an icon.
(7) The information processing apparatus according to (5),
 wherein the display control unit causes the display unit to display an icon for selecting any one of a first mode and a second mode,
 wherein the first operation is a drag operation to be performed on the map in a state in which the first mode is selected by the icon, and
 wherein the second operation is a drag operation to be performed on the map in a state in which the second mode is selected by the icon.
(8) The information processing apparatus according to any one of (4) to (7),
 wherein the target indication further includes a distance indication which indicates a distance from the center, and
 wherein the size setting operation is an operation which selects the radius from options of which at least a part corresponds to the distance indication.
(9) The information processing apparatus according to (8),
 wherein the display control unit causes the distance indication corresponding to a magnitude of a landmark included in the map to be displayed in a highlighted manner.
(10) The information processing apparatus according to any one of (1) to (9), further including:

a position identification unit for obtaining the center of the designated area as a position of a user recognized by the user and obtaining a size of the designated area as an error range of the position of the user.

(11) The information processing apparatus according to (10), further including:

a communication unit transmits information regarding the position of the user and the error range to a position estimation server, the information being transmitted as correction information for estimating the position.

(12) An information processing method including:

causing a display unit to display a map;

obtaining a first operation for moving a center of a designated area on the map;

obtaining a second operation different from the first operation for moving the center; and obtaining a size setting operation for setting a size of the designated area.

(13) A program for causing a computer to execute functions of:

causing a display unit to display a map;

obtaining a first operation for moving a center of a designated area on the map;

obtaining a second operation different from the first operation for moving the center; and obtaining a size setting operation for setting a size of the designated area.

(14) An information processing apparatus including:

a communication unit for receiving, from a terminal device which is used by a user, information regarding a center of a designated area on a map and a size of the designated area; and a position information correction unit for correcting information used to estimate a position of the user by using the center of the designated area as the position of the user recognized by the user and by using the size of the designated area as an error range of the position of the user.

(15) The information processing apparatus according to (14), wherein when the designated area corresponds to a landmark included in the map, the position information correction unit limits the error range of the position of the user to a range of the landmark.

The present disclosure contains subject matter related to that disclosed in Japanese Priority Patent Application JP 2012-143956 filed in the Japan Patent Office on Jun. 27, 2012, the entire content of which is hereby incorporated by reference.

What is claimed is:

1. An information processing apparatus comprising:
a processing circuitry configured to:
    cause a display unit to display a map;
    obtain a first move operation for moving a center of a designated area on the map displayed on the display unit;
    obtain a second move operation for moving the center of the designated area on the map displayed on the display unit,
    obtain input of a user including a position of the information processing apparatus on the map corresponding to a geographical location that the user indicates is a geographical location of the information processing apparatus, and the input of the user further includes an uncertainty of the position of the information processing apparatus on the map; and
    obtain a size setting operation for setting a size of the designated area.

2. The information processing apparatus according to claim 1, wherein the second move operation is an operation that finely adjusts a position of the designated area set by the first move operation.

3. The information processing apparatus according to claim 2, wherein the processing circuitry is configured to:
    convert an operation amount of the first move operation into a movement amount of the designated area at a first rate, and
    convert an operation amount of the second move operation into the movement amount of the designated area at a second rate smaller than the first rate.

4. The information processing apparatus according to claim 1,
    wherein the processing circuitry is configured to cause the display unit to display a target indication which includes an indication representing the center of the designated area, and
    wherein the size setting operation is an operation which designates a radius from the center of the designated area.

5. The information processing apparatus according to claim 4,
    wherein the first move operation is an operation which moves the center of the designated area by moving a display area on the map, and
    wherein the second move operation is an operation which moves the center of the designated area by moving the target indication.

6. The information processing apparatus according to claim 5,
    wherein the processing circuitry is configured to cause the display unit to display an icon for the movement in the second move operation,
    wherein the first move operation is a drag operation to be performed on the map, and
    wherein the second move operation is an operation to be performed for the icon.

7. The information processing apparatus according to claim 5,
    wherein the processing circuitry is configured to cause the display unit to display an icon for selecting any one of a first mode and a second mode,
    wherein the first move operation is a drag operation to be performed on the map in a state in which the first mode is selected by the icon, and
    wherein the second move operation is a drag operation to be performed on the map in a state in which the second mode is selected by the icon.

8. The information processing apparatus according to claim 4,
    wherein the target indication further includes a distance indication which indicates a distance from the center of the designated area, and
    wherein the size setting operation is an operation which selects the radius from one or more options of which at least a part corresponds to the distance indication.

9. The information processing apparatus according to claim 8, wherein the processing circuitry is configured to cause the distance indication corresponding to a magnitude of a landmark included in the map to be displayed in a highlighted manner.

10. The information processing apparatus according to claim 1, wherein the processing circuitry is configured to:
    obtain the center of the designated area as a position of the user recognized by the user, and obtain the size of the designated area as an error range of the position of the user.

11. The information processing apparatus according to claim 10, wherein the processing circuitry is configured to:
transmit information regarding the position of the user and the error range to a position estimation server, the information being transmitted as correction information for estimating the position.

12. An information processing method comprising:
causing a display unit to display a map;
obtaining a first move operation for moving a center of a designated area on the map displayed on the display unit;
obtaining a second move operation for moving the center of the designated area on the map displayed on the display unit;
obtaining input of a user including an apparatus position on the map corresponding to a geographical location that the user indicates is a geographical location of the apparatus, and the input of the user further includes an uncertainty of the apparatus position on the map; and
obtaining a size setting operation for setting a size of the designated area.

13. A non-transitory computer readable storage medium having stored thereon, a set of computer-executable instructions for causing a computer to perform steps comprising:
causing a display unit to display a map;
obtaining a first move operation for moving a center of a designated area on the map;
obtaining a second move operation for moving the center of the designated area on the map,
obtaining input of a user including an apparatus position on the map corresponding to a geographical location that the user indicates is a geographical location of the apparatus, and the input of the user further includes an uncertainty of the apparatus position on the map; and
obtaining a size setting operation for setting a size of the designated area.

\* \* \* \* \*